Nov. 29, 1966   H. H. HOPKINS   3,288,021
MICROSCOPE FOR MEASURING THE SIZE OF AN OBJECT
Filed Jan. 10, 1963   2 Sheets-Sheet 1
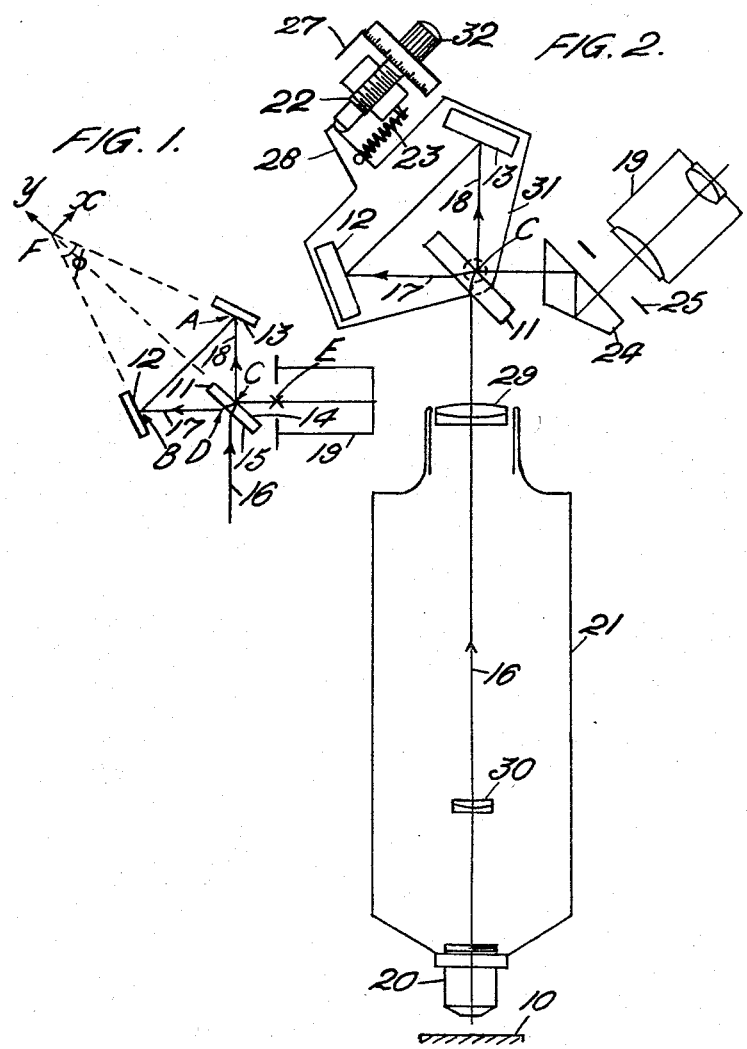
INVENTOR
Harold H. Hopkins
By Watson, Cole, Grindle & Watson
ATTORNEYS

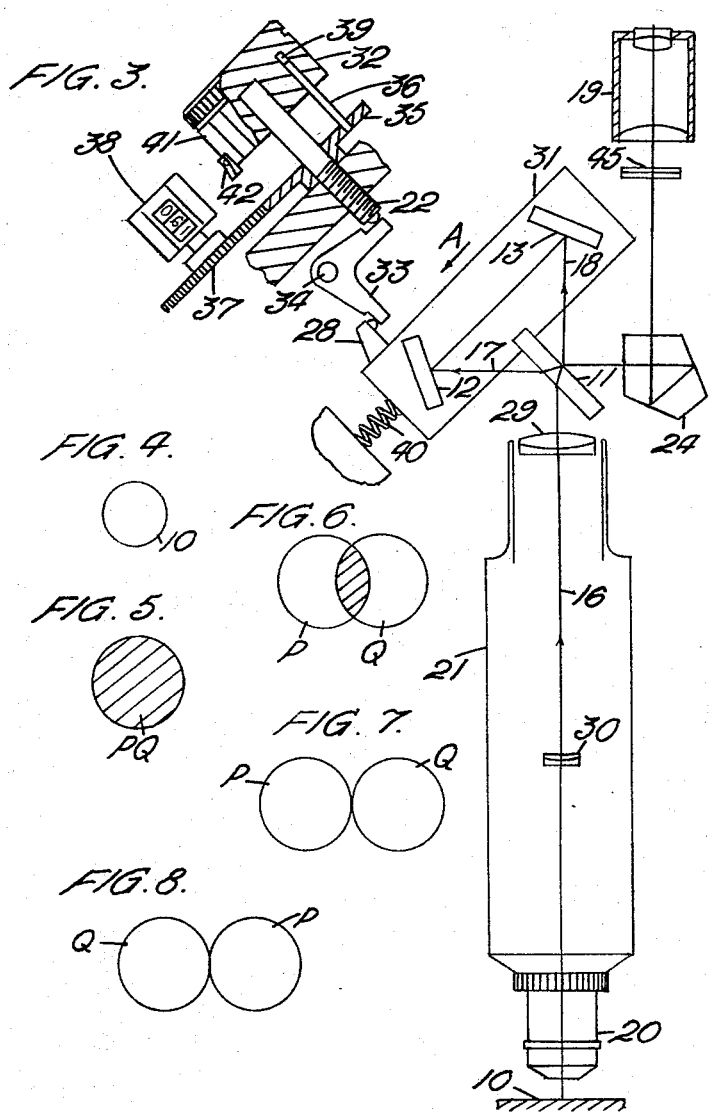

United States Patent Office 3,288,021
Patented Nov. 29, 1966

3,288,021
MICROSCOPE FOR MEASURING THE SIZE OF AN OBJECT
Harold Horace Hopkins, Barnet, England, assignor to W. Watson & Sons Limited, Barnet, England, a British company
Filed Jan. 10, 1963, Ser. No. 250,593
Claims priority, application Great Britain, Jan. 15, 1962, 1,467/62
5 Claims. (Cl. 88—14)

The invention relates to optical instruments and is more particularly, but not exclusively concerned with microscopes.

The invention provides an optical instrument comprising a beam carrying an image of an object, a beam splitting device for deriving (by division of amplitude) two beams from the said beam, two mirrors inclined to one another and arranged to reflect each of the two derived beams successively, in the reverse order for the two beams respectively, so that the two derived beams provide in a single field of view two images of the object, and means for moving the mirrors together as a unit to cause movement of the images relative to one another in the field of view.

The optical instrument may be used, for example, to enable the size of the object to be ascertained by measuring indirectly the relative movement of the images between two readily observable relative positions, which movement is related to the dimensions of the object and images.

Preferably the two mirrors are plane mirrors and the beam splitting device derives one of the said two derived beams by reflection at a plane surface and the other by transmission through that plane surface. Preferably the plane surface of the beam splitting device is arranged so that it bisects the angle contained between the two plane mirrors.

Preferably the beam splitting device and the two mirrors are fixed on a mounting so that the device is movable together with the mirrors as a unit. The mounting may be movable linearly in a direction perpendicular to the plane surface of the beam splitting device. Alternatively, the mounting may be rotatable about an axis in the plane of the plane surface of the beam splitting device, which axis is perpendicular to the direction of the said beam carrying an image of an object, but not co-incident with the line of intersection of the two mirrors.

Preferably a scale is provided for indicating the amount of movement of the two mirrors. Preferably the position of the mirrors is adjustable so that the two images of the object can be superimposed.

Two specific constructions of a microscope embodying the invention will now be described by way of example and with reference to the accompanying drawings, in which:

FIGURE 1 is a diagram of a device providing part of the optical system of a microscope, FIGURE 2 shows the device incorporated in a microscope, FIGURE 3 is a partly cut-away view of a modification of the apparatus shown in FIGURE 2, FIGURE 4 shows an object to be viewed by the microscope, and FIGURES 5–8 show diagrammatically various images formed by the device shown in FIGURE 1.

In the example shown in FIGURES 1 and 2, the microscope has an objective 20 fixed in one end of a cylindrical body 21, and an eyepiece 19. The device shown diagrammatically in FIGURE 1 is situated between the objective 20 and the eyepiece 19 of the microscope as shown in FIGURE 2. The device comprises two mirrors 12 and 13 and a glass block 11 having two optical faces 14 and 15, the face 14 being partially reflecting. A beam from the objective (represented in the drawings by its central axial ray 16), carrying an image of an object 10 being viewed by the microscope, is incident upon the glass block 11 and is refracted on passing through the face 15. At the face 14 some of the light is transmitted (ray 18) and some reflected (ray 17). The beam represented by the ray 18 is reflected by the mirrors 13 and 12 successively and passes through the glass block 11 to the eyepiece 19, whereas the beam represented by the ray 17 is reflected by the mirrors 12 and 13 successively and passes to the eyepiece 19 after reflection at the face 14 of the glass block 11. A prism 24 is located between the glass block 11 and the eyepiece 19, so as to direct the light leaving the block 11 (after reflection by the two mirrors 12 and 13) through a stop 25 and into the eyepiece 19. The two beams represented by the rays 17 and 18 respectively form images in the focal plane of the eyepiece 19 and when the mirrors 12 and 13 are in the position shown in the drawings, the two images are superimposed at E in the focal plane of the eyepiece. When the object 10 is circular as shown in FIGURE 4, the two superimposed images P and Q are as shown in FIGURE 5. The two mirrors 12 and 13 are fixed on a common mounting 31 which can be rotated about an axis perpendicular to the plane of the paper and passing approximately through the point C (i.e., the point at which the ray 16 was originally split to form the rays 17 and 18) in the example shown. The rotation of the mounting 31 is caused by rotating a knob 32 connected to a screw 22. A projecting arm 28 on the mounting 31 is kept in contact with one end of the screw 22 by means of a tension spring 23. A circular scale 27 is fixed to the screw 22.

When the mirrors are rotated about this axis through the point C, the two images P and Q formed in the focal plane of the eyepiece 19 from the two separate beams represented by rays 17 and 18, are sheared across each other (as shown in FIGURE 6) to produce a lateral separation of the two images P and Q. The amount of lateral separation depends, for a given position of the axis of rotation, upon the angle through which the pair of mirrors 12 and 13 is rotated, and the scale 27 is calibrated so that the lateral separation of the two images can be read directly from it.

In the case shown in FIGURE 6 the two images P and Q overlap each other in the region marked with shading lines; the mirrors 12 and 13 may however be rotated sufficiently to completely separate the images P and Q.

The microscope can be used to measure the size of small objects such as the object shown diagrammatically as a circle in FIGURE 4. The mirrors 12 and 13 are rotated in one direction until the two sheared images P and Q of the object 10 just touch each other as shown in FIGURE 7, and then the direction of rotation of the mirrors 12 and 13 is reversed until the images P and Q just touch one again as shown in FIGURE 8. By this reverse rotation, the positions of the two images P and Q are interchanged. The readings on the scale 27 at the two extreme positions of rotation of the mirrors 12 and 13 give a measure of the lateral dimensions of the object 10 which is being viewed by the microscope.

The optical distance between the objective 20 and the focal plane of the eyepiece 19 is increased by placing this device between them and for this reason tube length corrector lenses 29 and 30, each in the form of a doublet, are incorporated between the objective 20 and the glass block 11.

In this example, F is the point through which the line of intersection of the two mirrors 12 and 13 passes. It is the linear displacement of this point F in the x direction (i.e. a direction perpendicular to the axis of the block 11, both positive and negative x directions being permitted), that causes a lateral separation of the two final images, and the actual image separation S that is produced by a displacement $x$ is given by the equation $x = S/(4 \sin \phi)$ where $\phi$ is the angle contained between the mirrors 12 and 13.

Any movement of the point F in a direction parallel to the axis of the block 11 (i.e. positive or negative direction of y) causes defocusing of the images by moving the plane of the two images along the emergent optical axis a distance Z where Z is given by the equation $Z = (2 \sin \phi) y$. This defocusing is tolerated if it is kept small enough to have no effect on the image quality, provided that the principal rays are made parallel in the system. This telecentric arrangement is adopted to minimise any errors of magnification that result from such defocussing and also has the effect of minimising errors arising from magnification changes produced by defective focussing of the microscope when in use.

In the above example, the dimensions are as follows:

AB is 49.841 mm.
AC is 33.565 mm.
BD is 29.595 mm.
CE is 12.5 mm.

When the mirrors are rotated through 1° an image separation of 4 mm. is obtained.

In the modification shown in FIGURE 3, those parts which are similar to parts referred to in the previous example, have the same reference numerals as in the previous example. A microscope objective 20 is fixed at one end of a cylindrical hollow casing 21, which contains two tube length corrector lenses 29 and 30. A glass block 11 and two mirrors 12 and 13 are fixed on a mounting 31 slidable along its length. A micrometer screw 22, rotatable by means of a knob 32, is arranged with one end of the screw 22 abutting against one end of an L shaped coupling 33. The coupling 33 is pivotable about an axis 34 and the other end of the coupling 33 abuts against a projecting arm 28 on the mounting 31. One end of a rod 36 is slidably retained in a hole 39 in the knob 32, and the other end of the rod 36 is fixed to a rotatable gear wheel 35, slidable along the screw 22, so that the wheel 35 is caused to rotate with the knob 32. The wheel 35 engages with another gear wheel 37 coupled to a revolution counter 38. A scale 41 is provided on the knob 32 so that the scale 41 can be read against a pointer 42.

A compression spring 40 abuts against one end of the mounting 31 so that the arm 28 is urged into contact with the coupling 33. A prism 24 is arranged to direct the light leaving the glass block 11 (after reflection by the mirrors 12 and 13 as previously described), through a graticule 45 into the eyepiece 19.

The operation of this modified example is similar to that of the previous example, except that when the knob 32 is rotated to depress the screw 22 towards the coupling 33, the coupling 33 is pivotally moved to cause the mounting 31 to slide linearly against the spring 40 in the direction of the arrow A. When the knob 32 is rotated in the other direction, the spring 40 causes the mounting 32 to slide linearly against the direction of the arrow A. This linear sliding of the mounting 21 produces an effect similar to the displacement in the x direction referred to in the previous example. The images seen by the eyepiece 19 are similar to that of the previous example as the optical paths in the modified example are similar to those in the previous example. The lateral separation of the images seen by the eyepiece 19 (the separation being caused by movement of the mounting 31) can be measured from the revolution counter 38 and scale 41.

The graticule 45, positioned in the focal plane of the eyepiece 19, has two parallel lines on it so that the direction of shearing of the images seen in the eyepiece 19, can be determined relative to the shape of the object 10 being viewed by the microscope.

The invention is not restricted to the details of the foregoing examples. For instance the beam splitting device (shown in the above examples as the glass block 11) may be dichroic and thereby produce two images of complementary colours. This causes any overlapping of the two images to appear white.

In order to produce the small displacements of the two mirrors 12 and 13, a lever may be used. The lever may be pivoted near one end, so that the short arm of the lever will give a small displacement to the mounting 31 of the two mirrors when the longer arm is given a larger displacement.

The mirrors 12 and 13 need not be rotated about the point C, and rotation about other points will give different sensitivities. If the axis of rotation is near the point F then a larger rotation of the mirror pair is needed to produce a given shear S, but a larger defocussing Z will also occur. Alternatively, the axis of rotation may be further away from F and this will give less sensitivity of measurement but also a smaller defocussing. If a large shear S is to be produced then it is an advantage for the axis of rotation to pass through a point near C, since the size of mirrors 12 and 13 is then kept small.

I claim:

1. A microscope for measuring the size of an object by forming in the same field of view two images of an object, which microscope comprises an objective lens system for directing away from the object a primary beam carrying an image of the object, a single movable mounting, first and second plane mirrors rigidly mounted on said mounting in fixed relationship to each other so as to be inclined at a predetermined angle towards each other, a beam splitting device having a plane surface interposed between the objective lens system and said two mirrors to receive said primary beam from said objective lens system, said plane surface being substantially parallel to the bisector of the said predetermined angle between said two mirrors, said device serving to partially transmit and partially reflect said primary beam in order to derive, by division of amplitude, a first and second derived beam from the said primary beam, said first derived beam being formed by transmission through said plane surface to be reflected back to the plane surface by intersecting the first and second mirrors sequentially, said second derived beam formed by reflection at said plane surface to be reflected back to the plane surface by intersecting said second and first mirrors sequentially, and an eye-piece system positioned to receive from said plane surface said first and second derived beams, said first derived beam being received by transmission through said plane surface and said second derived beam being received by reflection at said plane surface subsequent to reflection by said mirrors whereby to form two images of the object in the same field of view, and control means to move said mounting together with said mirrors as a unit to effect movement of the mirrors along a perpendicular to said plane surface to cause lateral movement of the two images relative to each other in said field of view.

2. A microscope as claimed in claim 1 in which said objective lens system, said eye-piece, the beam splitting device and two plane mirrors are telecentrically arranged so that said beam splitting device and said two plane mirrors are in a portion of the light path of the microscope having substantially parallel rays whereby changes in image size due to change of focus are minimized.

3. A microscope as claimed in claim 2 in which the said movable mounting is movable linearly in a direction perpendicular to the said plane surface.

4. A microscope as claimed in claim 2 in which the planes of the two plane mirrors intersect along a line of intersection and the said movable mounting is rotatable about an axis in the plane of the plane surface of the beam splitting device which axis is parallel to but spaced apart from the said line of intersection.

5. A microscope as claimed in claim 1 in which a calibrated micrometer screw is arranged to be movable along its length in a direction perpendicular to the plane surface of the beam splitting device, and has one end abutting against part of said mounting.

References Cited by the Examiner
UNITED STATES PATENTS 3,068,743   12/1962   Dyson _____ 88—14

OTHER REFERENCES

P. Hariharan and R. G. Singh, Achromatic Fringes Formed in a Triangular Path Interferometer, J. Optical Society of America, vol. 49, July 1959, pp. 732 and 733.

JEWELL H. PEDERSEN, *Primary Examiner.*

W. L. SIKES, *Assistant Examiner.*